July 20, 1965
R. J. SMITH
3,195,370
REMOTE CONTROL UNIT
Filed March 18, 1963
2 Sheets-Sheet 2
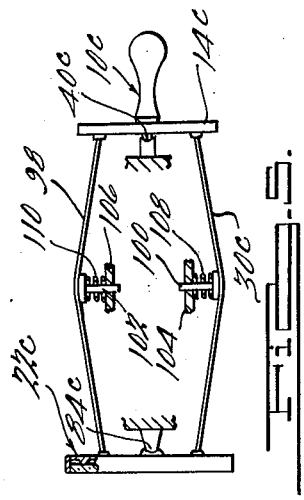
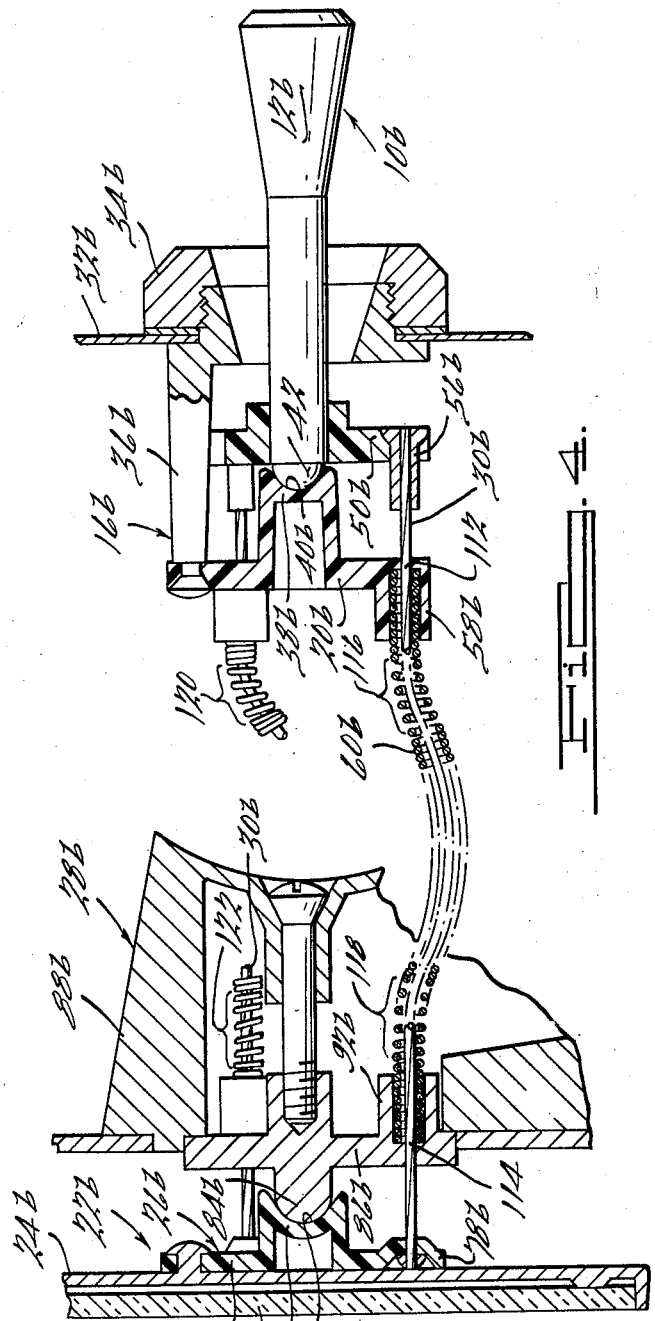
INVENTOR.
Robert J. Smith
BY
Harness, Dickey & Pierce
ATTORNEYS.

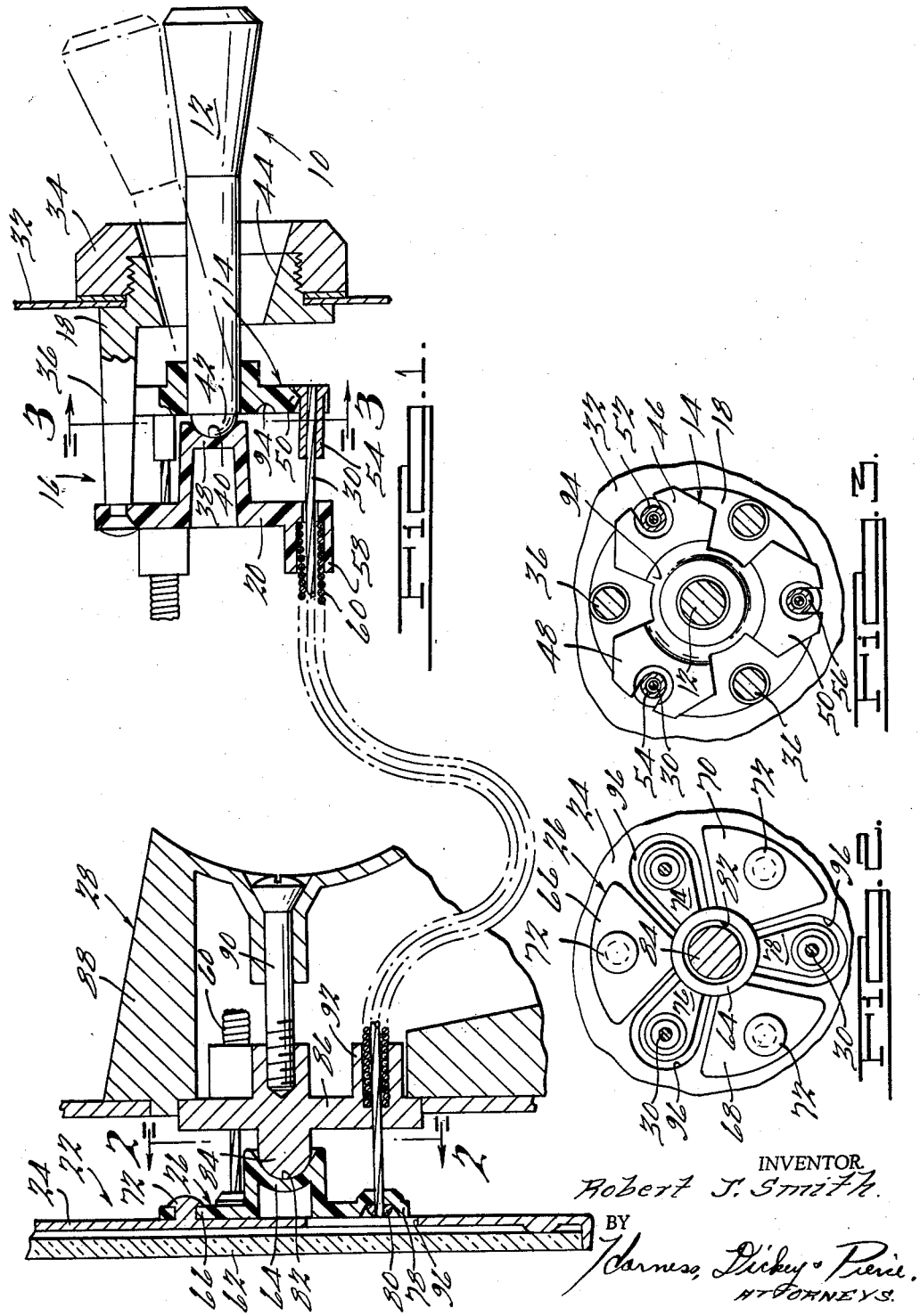

United States Patent Office 3,195,370
Patented July 20, 1965

3,195,370
REMOTE CONTROL UNIT
Robert J. Smith, Farmington, Mich., assignor to C. M. Hall Lamp Company, Detroit, Mich., a corporation of Michigan
Filed Mar. 18, 1963, Ser. No. 265,853
16 Claims. (Cl. 74—501)

This invention relates to remote control mechanisms and more particularly to devices for remotely controlling automobile rear view mirrors, lamps and the like.

In the art to which this invention pertains, coupling means are provided between a pivotally mounted controlling member, such as an actuating handle, and a pivotally mounted controlled member, such as a mirror, lamp or the like, for transmitting pivotal movement of the controlling member to the controlled member. The present invention relates to the use of mechanical coupling means between those elements and in the specific illustrated arrangements the coupling means comprises a plurality of cables each including a wire extending between the controlled and controlling members so that movement of the controlling member is communicated to the controlling member as a result of translational movement of the wire.

In such systems, it is often advantageous to apply a tensioning force to the interconnecting wires in order to produce improved operation, to compensate for changes in the length of the wire, and, in some cases, to improve the stability of the system by effectively preloading the pivot bearing at the controlling end, at the controlled end, or both.

An object of this invention is to improve the pivot bearings in a remote control system.

Another object of this invention is to improve the means for tensioning one or more control wires extending between controlling and controlled members.

The manner of accomplishing the foregoing objects and other objects and features of the invention may be perceived from the following detailed description of embodiments of the invention when read with reference to the accompanying drawings in which:

FIG. 1 is a fragmentary view in partial section of a remote control system embodying certain of the principles of the present invention;

FIG. 2 is a sectional view of a portion of the controlled member of FIG. 1 taken substantially along the line 2—2 of FIG. 1;

FIG. 3 is a sectional view of a portion of the controlling member of FIG. 1 taken substantially along the line 3—3 of FIG. 1;

FIG. 4 is a fragmentary view in partial section of a modified form of remote control system embodying certain of the principles of the present invention; and FIG. 5 is a schematic illustration of certain of the principles involved in the control system of FIG. 4.

Referring to FIG. 1 of the drawings, a controlling member 10, comprising an actuating handle 12 and a controlling spider 14, is pivotally supported upon a support assembly 16 comprising a body 18 and a pivot plate 20. A controlled member 22, comprising a plate 24 and a controlled spider 26, is pivotally supported on a support assembly 28 which, in use, is supported in fixed relation to support assembly 16. A plurality of wires, including wire 30, interconnect the controlling member 10 and the controlled member 22 to transmit pivotal movement of the controlling spider 14 to the controlled spider 26.

In the arrangement illustrated in FIG. 1, the support body 18 is mounted in an aperture in a panel 32. If the remote control apparatus is utilized in conjunction with an automobile, panel 32 may be, for example, a portion of the instrument panel or a portion of the door panel of the automobile. Support body 18 is secured to panel 32 by any suitable means such as a nut 34 threadedly engaging body 18 in a position to clasp panel 32 therebetween.

Support body 18 is provided with a plurality (representatively three) of projecting leg portions, such as leg portion 36, extending generally parallel with one another and parallel with the longitudinal axis of the support body 18. Pivot plate 20 is supported upon those three leg portions and is secured thereto as by riveting or the like. Pivot plate 20 includes a projecting boss portion 38 having a spherical seat 40 adapted to accept the spherical end portion 42 of the actuating handle 12. Actuating handle 12 projects through a conical aperture 44 formed in the body 18 and in the nut 34 and carries the controlling spider 14. As can best be seen in FIG. 3 of the drawings, controlling spider 14 is provided with a plurality of radially projecting fingers 46, 48 and 50, each pair of which straddles one of the leg portions such as leg portion 36. In the illustrated arrangement, the projecting fingers 46, 48 and 50 are sufficiently long to limit the magnitude of the rotational movement of the controlling spider 14 about its central axis.

Each of the projecting fingers 46, 48 and 50 is provided with an end slot to accept the ferrules 52, 54 and 56, respectively, and is provided with a socket adjacent that slot to accept the enlarged head portion of the corresponding ferrule. Ferrule 56 is secured to the end of the control wire or element 30 and ferrules 52 and 54 are correspondingly secured to the other wires.

Wire 30 extends through an aperture in pivot plate 20 and through a counterbored boss 58 which is adapted to accept the end of the sheath or casing 60 which surrounds the wire 30. Corresponding counterbored bosses are provided upon the pivot plate 20 to accept other casings individual to the others of the wires. In the preferred arrangement, three wires such as wire 30 are employed and their individual ferrules, such as ferrule 56, are connected to the controlling spider 14 at points spaced from the longitudinal axis of the handle 12 and centered thereabout at 120° intervals.

In the illustrated arrangement, the controlled member 22 is assumed to be a mirror 62 supported within the backing plate 24. The controlled spider 26, constituting another portion of the controlled member 22, is illustrated to be formed with a central hub or boss 64 (FIGS. 1 and 2) from which six fingers project radially. Three of those fingers, fingers 66, 68 and 70, are spaced at 120° intervals about the hub 64 and each is apertured to accept an individual rivet portion or rivet, such as rivet portion 72, for securing the controlled spider 26 to the plate 24. The remaining three fingers 74, 76 and 78 on the controlled spider 26, are spaced at 120° intervals about hub 64 and are individually disposed between adjacent ones of the fingers 66, 68 and 70. Each of the fingers 74, 76 and 78 is provided with a countersunk aperture to accept the individual ferrules, such as ferrule 80, secured to the other ends of the individual control wires. The hub or boss 64 of the controlled spider 26 is provided with a concavity 82 which acts as a socket cooperating with the spherical end portion 84 of a pivot plate 86. Pivot plate 86 is mounted upon the body portion 88 of the support assembly 28 by means such as a screw 90 passing through an aperture in a wall of the body 88 and threadedly engaging the pivot plate 86. The body 88 is in turn supported in fixed relation to the controlling member support assembly 16 in any suitable fashion. If the system is employed on an automobile, the support assembly 16 may be mounted on the outside of the door or on the fender, as examples.

Pivot plate 86 is provided with three apertures to accept the three control wires, such as wire 30, and is further provided with a corresponding number of counterbored bosses, such as boss 92, to accept the free ends of the individual sheaths or casings, such as casing 60.

In operation, pivotal movement of the actuating handle 12 about its spherical end 42 serves to change the position of the three ferrules, such as ferrule 56, mounted thereon and thus to change the position of the corresponding ends of the three control wires, such as wire 30. The resulting changed position of the remote end of those control wires produces tilting movement of the controlled member 22 about the spherical portion 84 in the pivot plate 86. It will be appreciated that the positions of the ball and socket elements, at each end, may be reversed or that other pivoting means, such as gimbels, may be employed.

Either the controlling spider 14 or the controlled spider 26, or both, may be employed as a means for applying tensioning forces to the control wires. In the illustrated arrangement, both means are employed and each of the three control wires is individually tensioned.

In the illustrated arrangement, controlling spider 14 is designed to exert a force upon the individual ferrules such as ferrules 56, and hence upon the individual control wires, such as wire 30. This is accomplished by rendering the individual fingers 46, 48 and 50 resilient so that they act in the nature of cantilever springs tending to bias or force the ends of the control wires away from their remote ends. To this end, the controlling spider 14 is manufactured of resilient and flexible material such as nylon. To permit the controlling spider to be sufficiently rigid to withstand the forces while yet imparting flexibility to the fingers, in the illustrated arrangement a groove 94 is formed across the base of the fingers 46, 48 and 50 to reduce their cross sections and hence to reduce their stiffness. Tensioning forces are established during assembly of the apparatus such as by controlling the length of the several control wires so that the projecting fingers 46, 48 and 50 are under stress when the wires are in place. For simplicity of illustration, the finger 50 has been illustrated as extending generally perpendicularly to the longitudinal axis of the handle 12 as accomplished, for example, by molding the controlling spider 14 in a manner to cause the projecting fingers to be deflected to the right (FIG. 1) of their illustrated positions when the controlling spider is in its free, unstressed state. Alternatively, the fingers can be formed so as to lie in a plane perpendicular to the longitudinal axis of the controlling spider 14 when in their free and unstressed state and then be deflected to the left (FIG. 1) upon the installation of the wires thereto. In either case, the deflection of the fingers from their free state should be sufficient, either alone or in conjunction with the flexing operation of the controlled spider, to accommodate the minor changes in length of the wires which may occur during use. Of course, if desired, means may be provided on the unit for adjusting the tension in the wires from time to time during the use of the apparatus, such as by threading member 14 onto member 12.

The fingers 74, 76 and 78 of the controlled spider 26 deflect in a manner similar to that above described in connection with the controlling spider 14, and again they may be molded to have either a free position which is to the left to the position illustrated in FIG. 1 or may be molded flat in which case they will tend to deflect to the right (FIG. 1) upon the application of tension. In the illustrated arrangement, sections of the backing plate 24 are cut out as at 96 (FIGS. 1 and 2) to prevent that backing plate from interfering with the free movement of the flexible fingers. The controlled spider 26 is desirably made of a resilient material such as nylon and in the illustrated arrangement both the bearing seat 82 and the bearing seat 38 are made of a plastic such as nylon to enhance the operation of the bearings.

It will be appreciated that if one of the plurality of control elements or wires such as wire 30 be tensioned by the use of a means such as spring finger 50 or spring finger 78, or both, the reactive forces will tend to tension the others of the plurality of wires so that it is not essential that all of the plurality of wires be provided with individual tensioning means.

The modified arrangement illustrated in FIG. 4 of the drawings is similar in major respects to the apparatus of FIG. 1 and corresponding parts have been correspondingly designated so that the foregoing description may be applied thereto. While the controlling spider 14b and the controlled spider 26b have been shown in FIG. 4, for simplicity of illustration, to be similar in form to those shown in FIG. 1, those elements need not be provided with flexible fingers and it will be observed that in FIG. 4 there are no counterparts of the backing-plate cutouts such as cutout 96 and that there is no cross-section reducing groove 94 (FIGS. 1 and 3) in element 14b although it will be understood that the feature of the flexible fingers may also be employed in the system of FIG. 4 in addition to the tensioning means there disclosed, if desired.

In the arrangement of FIG. 4, the force for tensioning the wires, such as wire 30b, is achieved by applying a force transverse to the longitudinal axis of the wire. With the representative three wires in place and connected to the two pivotally mounted controlling and controlled members, the distance between the two ends of each wire is essentially fixed. As a result, if a portion of the wire between its ends is forced laterally of its free position, that force will result in reactive tensioning forces in the wire, with each reach of the wire between the point of forced application and each end being pulled toward the point of force application so that both reaches of the wire are under tension. The principle involved is illustrated in the schematic diagram of FIG. 5 in which the controlling member 10 is shown to be pivoted in a socket 40c and the controlled member 22c is shown to be pivoted about a spherical surface 84c. The two ends of the wire 30c are connected to the controlling spider 14c and the controlled member 22c and the two ends of a second illustrative wire 98 are similarly connected. The schematically illustrated force-producing means is shown to comprise a pair of headed pins 100 and 102 slidably supported in apertured plates 104 and 106, respectively, which are fixed in position relative to elements 40c and 84c. A spring 108 acts between the head of pin 100 and the plate 104 to tend to force the head of pin 100 against wire 30c to deflect it from its free position and hence to tension that wire, and a corresponding resilient or spring means 110 operates through pin 102 to tension wire 98. The forces are exerted laterally or transversely of the longitudinal axis (the longitudinal center line) of the wire. In the schematic illustrations, those forces are also exerted perpendicular to that longitudinal axis at the point or force application, but this is not essential, nor is it essential that the force be applied at but one point of the wire.

The function of the laterally-deflecting resilient force exerting means of FIG. 5 is performed in the system of FIG. 4 by the individual wire sheaths or casings such as 60b. Those sheaths or casings are or may be manufactured of coiled wires which normally are in tight turn-to-turn abutment. By increasing the pitch of all or a portion or portions of the turns of the sheath or casing between its ends, that casing may be caused to act (with heat treatment if necessary) as a coil spring. If the free length of that casing between its ends is selected to be greater than the length of the enclosed control wire between the same two points in the assembly (that is, for example, if the free length of casing 60b is greater than the distance between points 112 and 114 on wire 30b), the casing will be under compression and that portion or those portions thereof which is expanded to act as a spring will be compressed. As a result, the casing will deflect from a straight-line position in an effort to relieve that stress, and its inner wall will engage the control wire 30b to tend to deflect that control wire laterally or transversely of its longitudinal axis and thereby tension the control wire. This effect, of course, will be distributed over the length of the engagement between the casing and the control wire or core, as distinguished from the arrangement schematically illustrated in FIG. 5.

The casing 60b has been illustrated as having been thus expanded at a portion 116 thereof proximate the controlling element assembly and at a portion 118 thereof proximate the controlled element assembly. Another one of the sheaths is illustrated in elevational view in FIG. 4 of the drawings with expanded portions 120 and 122. It will be recognized that the spring means may take other forms and may be separate from the casing, as, for example, a coil spring acting at the end of casing and extending coaxially therewith.

It will be perceived that the principles of the invention can be applied other than to the shown and described three-wire systems and that other means may be employed for achieving the control-wire tensioning which is the subject of this invention within the spirit and scope of the appended claims.

What is claimed is:

1. In a remote control system, a controlled member supported by a first fixed member for pivotal movement about a plurality of different axes with respect thereto, a controlling member spaced from said controlled member and support by a second fixed member for pivotal movement about a second plurality of axes, means for transmitting pivotal movements of said controlling member about any of said second plurality of axes to said controlled member comprising a plurality of control elements extending between said controlling member and said controlled member and movable in response to pivotal movements of said controlling member about its said axes to move said controlled member about its said axes, and means for tensioning said control elements comprising resilient means exerting a force on at least one of said control elements in a direction transverse to the longitudinal axis thereof.

2. In a remote control system, a controlled member supported by a first fixed member for pivotal movement about a plurality of different axes with respect thereto, a controlling member spaced from said controlled member and supported by a second fixed member for pivotal movement about a second plurality of axes, said first and second fixed members being in fixed relation to one another, means for transmitting pivotal movements of said controlling member about any of said second plurality of axes to said controlled member comprising a plurality of control elements extending between said controlling member and said controlled member and movable in response to pivotal movements of said controlling member about its said axes to move said controlled member about its said axes, and means for tensioning said control elements comprising resilient means exerting a force on each of said control elements in a direction transverse to the longitudinal axis thereof.

3. In a remote control system, a controlled member mounted for pivotal movement, a controlling member spaced from said controlled member and mounted for pivotal movement, means for transmitting pivotal movement of said controlling member to said controlled member comprising a control wire extending between said controlling member and said controlled member, and means for tensioning said control wire comprising casing means under compression surrounding said control wire over a major portion of the length thereof and resiliently forcing portions of said control wire in a direction transverse to the longitudinal axis thereof.

4. In a remote control system, a controlled member mounted for pivotal movement, a controlling member spaced from said controlled member and mounted for pivotal movement, means for transmitting pivotal movement of said controlling member to said controlled member to said controlled member comprising a plurality of control wires extending between said controlling member and said controlled member, and means for tensioning said control wires comprising casing means under compression surrounding at least one of said control wires over a major portion of the length thereof and resiliently forcing portions of said control wire in a direction transverse to the longitudinal axis thereof.

5. In a remote control system, a controlled member mounted for pivotal movement, a controlling member spaced from said controlled member and mounted for pivotal movement, means for transmitting pivotal movement of said controlling member to said controlled member comprising a plurality of control wires extending between said controlling member and said controlled member, and means for tensioning said control wires comprising casing means surrounding each of said control wires over a major portions of the length thereof and resiliently forcing portions of each said control wires in a direction transverse to the longitudinal axis thereof.

6. In a remote control system, a controlled member mounted for pivotal movement about a point, a controlling member spaced from said controlled member and mounted for pivotal movement about a point, a projecting flexible cantilever spring element mounted on and movable with one of said members and having a free portion spaced from the pivot point therefor, and means for transmitting pivotal movement of said controlling member to said controlled member comprising a control wire extending between said free portion of said cantilever spring element and the other one of said members.

7. In a remote control system, a controlled member mounted for pivotal movement about a point, a controlling member spaced from said controlled member and mounted for pivotal movement about a point, a plurality of spaced divergent flexible cantilever spring elements mounted on and movable with one of said members and each having a free portion spaced from the pivot point therefor, and means for transmitting pivotal movement of said controlling member to said controlled member comprising an individual control wire extending between said free portion of each of said cantilever spring elements and the other one of said members.

8. In a remote control system, a controlled member, a support assembly therefor, cooperating ball and socket pivot elements mounted on said support assembly and said controlled member and cooperating to permit pivotal movement of said controlled member with respect to said support assembly, resilient cantilever spring means integral with that one of said elements which is mounted on said controlled member and having a free portion projecting and spaced from the pivot point therefor, a controlling member spaced from said controlled member and mounted for pivotal movement, and means for transmitting pivotal movement of said controlling member to said controlled member comprising a control wire extending between said free portion of said cantilever spring means and said controlling member.

9. In a remote control system, a controlled member mounted for pivotal movement, a controlling member spaced from said controlled member, a support assembly for said controlling member, cooperating ball and socket pivot elements mounted on said support assembly and said controlling member and cooperating to permit pivotal movement of said controlling member with respect to said support assembly, resilient cantilever spring means integral with that one of said elements which is mounted on said controlling member and having a free portion projecting and spaced from the pivot point therefor, and means for transmitting pivotal movement of said controlling member and having a free portion projecting and spaced from the pivot point therefor, and means for transmitting pivotal movement of said controlling member to said controlled member comprising a control wire extending between said free portion of said cantilever spring means and said controlled member.

10. In a remote control system, a controlled member, a support assembly therefor, cooperating ball and socket pivot elements mounted on said support assembly and said controlled member and cooperating to permit pivotal movement of said controlled member with respect to said support assembly, resilient cantilever spring means integral with that one of said elements which is mounted on said controlled member and having a free portion projecting and spaced from the pivot point therefor, a controlling member spaced from said controlled member, a support assembly for said controlling member, cooperating ball and socket pivot elements mounted on said support assembly and said controlling member and cooperating to permit pivotal movement of said controlling member with respect to said support assembly, resilient cantilever spring means integral with that one of said elements which is mounted on said controlling member and having a free portion projecting and spaced from the pivot point therefor, and means for transmitting pivotal movement of said controlling member to said controlled member comprising a control wire extending between said free portions of the two cantilever spring means.

11. In a remote control system, a controlled member mounted for pivotal movement, a controlling member spaced from said controlled member, a support assembly for said controlling member, cooperating ball and socket pivot elements mounted on said support assembly and said controlling member and cooperating to permit pivotal movement of said controlling member with respect to said support assembly, resilient cantilever spring means integral with that one of said elements which is mounted on said controlling member and having a free portion projecting and spaced from the pivot point therefor, means for transmitting pivotal movement of said controlling member to said controlled member comprising a control wire extending between said free portion of said cantilever spring means and said controlled member, and further means for tensioning said control wire comprising resilient means exerting a force on said control wire in a direction transverse to the longitudinal axis thereof.

12. The combination of claim 1 in which said resilient means includes a casing surrounding at least one of said control elements and operating in compression and secured at its ends to said first and second fixed members.

13. The combination of claim 12 in which the free longitudinal length of said casing between points on said fixed members is greater than the length of said control element between said points.

14. The combination of claim 3 in which said controlled member and controlling member are mounted for pivotal movement about two spaced-apart fixed elements, in which said casing means is secured at its ends to said fixed members.

15. The combination of claim 14 in which said casing means comprises a spiral metallic element and in which at least a portion of the adjacent turns are spaced apart.

16. The combination of claim 15 in which the free longitudinal length of said casing means between points on said fixed elements is greater than the length of said control wire between said points.

References Cited by the Examiner
UNITED STATES PATENTS

| | | | |
|---|---|---|---|
| 2,014,397 | 9/35 | Smith. | |
| 2,491,341 | 12/49 | Tillman | 74—10.7 |
| 2,647,409 | 8/53 | Keim | 74—242.8 X |
| 3,046,840 | 7/62 | Barcus | 74—501 X |

BROUGHTON G. DURHAM, *Primary Examiner.*

MILTON KAUFMAN, *Examiner.*